US 7,522,311 B2

(12) United States Patent
Marsden et al.

(10) Patent No.: US 7,522,311 B2
(45) Date of Patent: *Apr. 21, 2009

(54) METHODS AND APPARATUS FOR COLORANT REDUCTION

(75) Inventors: Jonathan B. Marsden, San Mateo, CA (US); Dion Monstavicius, Daly City, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/772,478

(22) Filed: Jul. 2, 2007

(65) Prior Publication Data

US 2008/0013116 A1 Jan. 17, 2008

Related U.S. Application Data

(63) Continuation of application No. 11/370,495, filed on Mar. 6, 2006, now Pat. No. 7,239,403, which is a continuation of application No. 10/351,230, filed on Jan. 24, 2003, now Pat. No. 7,023,570.

(51) Int. Cl.
*G06F 15/00* (2006.01)
*G06K 15/10* (2006.01)

(52) U.S. Cl. ........................ 358/1.9; 358/518

(58) Field of Classification Search .................. 358/1.1, 358/1.8, 1.9, 1.13, 1.15, 1.18, 518, 3.01, 358/3.23, 500; 382/162, 167
See application file for complete search history.

(56) References Cited

U.S. PATENT DOCUMENTS

| | | | |
|---|---|---|---|
| 5,047,842 A | 9/1991 | Bouman, Jr. et al. |
| 5,260,806 A | 11/1993 | Samworth |
| 5,519,815 A | 5/1996 | Klassen |
| 5,633,662 A | 5/1997 | Allen et al. |
| 5,646,670 A | 7/1997 | Seto et al. |
| 5,786,908 A * | 7/1998 | Liang | ..................... 358/518 |
| 5,872,896 A | 2/1999 | Li et al. |
| 5,987,168 A | 11/1999 | Decker et al. |
| 6,340,975 B2 | 1/2002 | Marsden et al. |
| 6,344,900 B1 | 2/2002 | Hidaka |
| 6,585,340 B1 | 7/2003 | Borrell |
| 6,614,555 B1 | 9/2003 | Hidaka |
| 6,775,633 B2 | 8/2004 | Edge |
| 2002/0154325 A1 | 10/2002 | Holub |
| 2003/0053097 A1 | 3/2003 | Ohga et al. |
| 2003/0072043 A1 | 4/2003 | Hagai et al. |
| 2004/0114159 A1 | 6/2004 | Couwenhoven et al. |
| 2004/0165199 A1 | 8/2004 | Klassen et al. |

FOREIGN PATENT DOCUMENTS

EP 1168822 A1 1/2002

* cited by examiner

*Primary Examiner*—Gabriel I Garcia
(74) *Attorney, Agent, or Firm*—Michael A. Glenn; Glenn Patent Group

(57) ABSTRACT

Methods and apparatus for performing colorant limitation are provided that receive input data, desired output response data and measured (or specified) output response data for a print output device, and determine converted input data that accounts for differences between the measured (or specified) output response data and the desired output responses of the printer. Converted input data may then be provided to a conventional colorant limitation algorithm for performing colorant limitation. Colorant-limited input data are then de-converted by accounting for differences between the desired output response data and the measured (or specified) output responses of the printer.

12 Claims, 12 Drawing Sheets

METHODS AND APPARATUS FOR COLORANT REDUCTION

REFERENCE TO RELATED APPLICATIONS

This application is a continuation of U.S. application Ser. No. 11/370,495, filed Mar. 6, 2006, now U.S. Pat. No. 7,239,403, which is a continuation of U.S. application Ser. No. 10/351,230, filed Jan. 24, 2003, now U.S. Pat. No. 7,023,570.

BACKGROUND

This invention pertains to digital imaging. More particularly, this invention relates to methods and apparatus for reducing colorant used in digital printing.

A digital printer receives image data from a computer and places colorant, such as ink or toner, on a sheet of receiving material, such as paper or transparency plastic. The printer may use a variety of different technologies to transfer colorant to the page, including inkjet, thermal dye transfer, thermal wax, electrophotographic, silver halide, and other processes. High quality digital color printers typically use a combination of cyan, magenta, yellow, and black ("CMYK") colorants, although some printers may use more than or less than these four colorants. Each individual colorant commonly is referred to as a "channel," with the amount of colorant for each channel typically specified as a percentage between 0 and 100%. Thus, on a four-color printer, the maximum amount of colorant that may be specified is 400%, corresponding to 100% on all four channels.

If excessive colorant is used, however, undesirable image artifacts such as bleeding (an undesirable mixing of colorants along a boundary between printed areas of different colorants), cockling (warping or deformation of the receiving material that may occur from using excessive colorant), flaking and smearing may result that produce an unacceptable print. In severe cases, excessive ink may cause the receiving material to warp so much that it interferes with the mechanical operation of the printer and may damage the printer. In addition, for many color printers, satisfactory density and color reproduction can generally be achieved without using the maximum amount of colorant. Therefore, using excessive colorant not only may cause undesirable image artifacts and may damage a printer, but it also wastes colorant. Generally, the amount of colorant needed to cause undesirable image artifacts (and therefore be considered excessive) depends on the receiver material, colorant and printer technology.

To minimize the effects of excessive colorant, previously known printing systems often include colorant limitation devices or methods. Referring to FIG. 1, a conventional colorant limitation system is described. Colorant limitation system 10 includes colorant limiter 12, which receives input data and provides colorant-limited input data to print output device 14, which generates a print document in accordance with the colorant-limited input data. Previously known techniques for limiting colorant usage, such as the system of FIG. 1, have typically performed colorant reduction without including the effects of actual print output device performance. For example, Allen et al. U.S. Pat. No. 5,633,662 ("Allen") describes a process for controlling ink volume in liquid ink printing systems by comparing the total specified ink volume per pixel to a selected maximum total ink volume per pixel. Depleted ink volumes are formed by applying a scaling factor to each pixel, or to those pixels having ink volumes that exceed a threshold ink volume. Likewise, Li et al. U.S. Pat. No. 5,872,896 ("Li") describes an ink limiting algorithm in which pixels that exceed a total ink limit are reduced, with some pixels reduced to values that are significantly below the total ink limit. Neither Allen nor Li, however, describe ink limiting methods or apparatus that include a direct measurement of actual printer behavior or specified behavior as part of the ink reduction determination.

Indeed, previously known colorant-reduction techniques typically are optimized for speed, and do not consider variations in engine state that may significantly affect print device output. For example, a print output device may include one or more color channels, with each color channel having a nominal output response. As a result of ageing or device imperfections, one or more color channels may have an actual output response that differs from the nominal response. For example, the output of one color channel may be only 50% of the nominal output. As a result, although the specified amount of colorant for that channel may be 60%, the actual amount of colorant provided by the channel may be only 30%. Nevertheless, a conventional ink limitation algorithm would operate in the usual manner, although the print device actually can tolerate a higher specified amount of colorant because the actual output has already been limited by some other mechanism or defect.

In view of the foregoing, it would be desirable to provide methods and apparatus for performing colorant limitation that prevent unnecessary colorant limitation.

It further would be desirable to provide methods and apparatus for performing colorant limitation that include the effects of actual print device performance.

It also would be desirable to provide methods and apparatus for performing colorant limitation that may be modified to accommodate changes in print output device performance.

It additionally would be desirable to provide methods and apparatus for performing colorant limitation that include the effects of specified device performance.

SUMMARY

This invention provides colorant limitation methods and apparatus that receive input data, desired output response data and measured (or specified) output response data for a print output device, and then convert the input data to equivalent input data by accounting for differences between the desired output response data and measured (or specified) output responses of the printer. The equivalent input data are then provided to a conventional colorant limitation algorithm for colorant limitation. The colorant-limited input data are then converted to equivalent colorant-limited input data by again accounting for differences between the desired output response data and measured (or specified) output responses of the printer.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which.

DETAILED DESCRIPTION

The present invention provides colorant limitation methods and apparatus that receive input data and desired and measured (or specified) output response data for a print output device, and then convert the input data to equivalent input data by accounting for differences between the desired and measured (or specified) output responses of the printer. Methods and apparatus in accordance with this invention further provide the equivalent input data to a conventional colorant limitation algorithm for performing colorant limitation. The colorant-limited input data are then converted to equivalent colorant-limited input data by again accounting for differences between the desired and measured (or specified) output responses of the printer. As used herein, a printer is any print output device, such as a printer, photocopier, facsimile machine, or other similar print output device, that receives data and places colorant, such as ink or toner, on a sheet of receiving material, such as paper, using technologies such as inkjet, thermal dye transfer, thermal wax, electrophotographic, silver halide, or other similar technologies.

Figure 1:
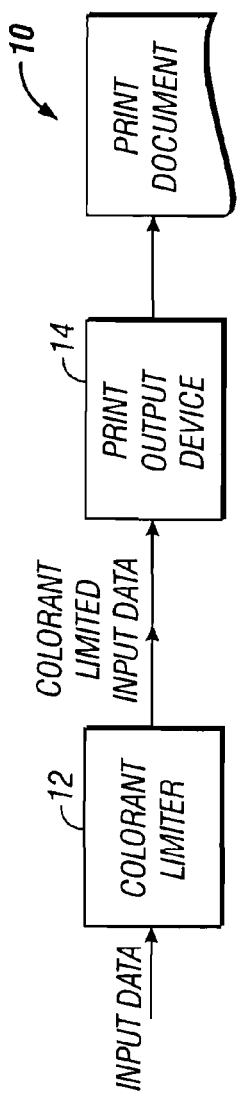
FIG. 1 is a block diagram of a previously known colorant limitation system.
Figure 2:
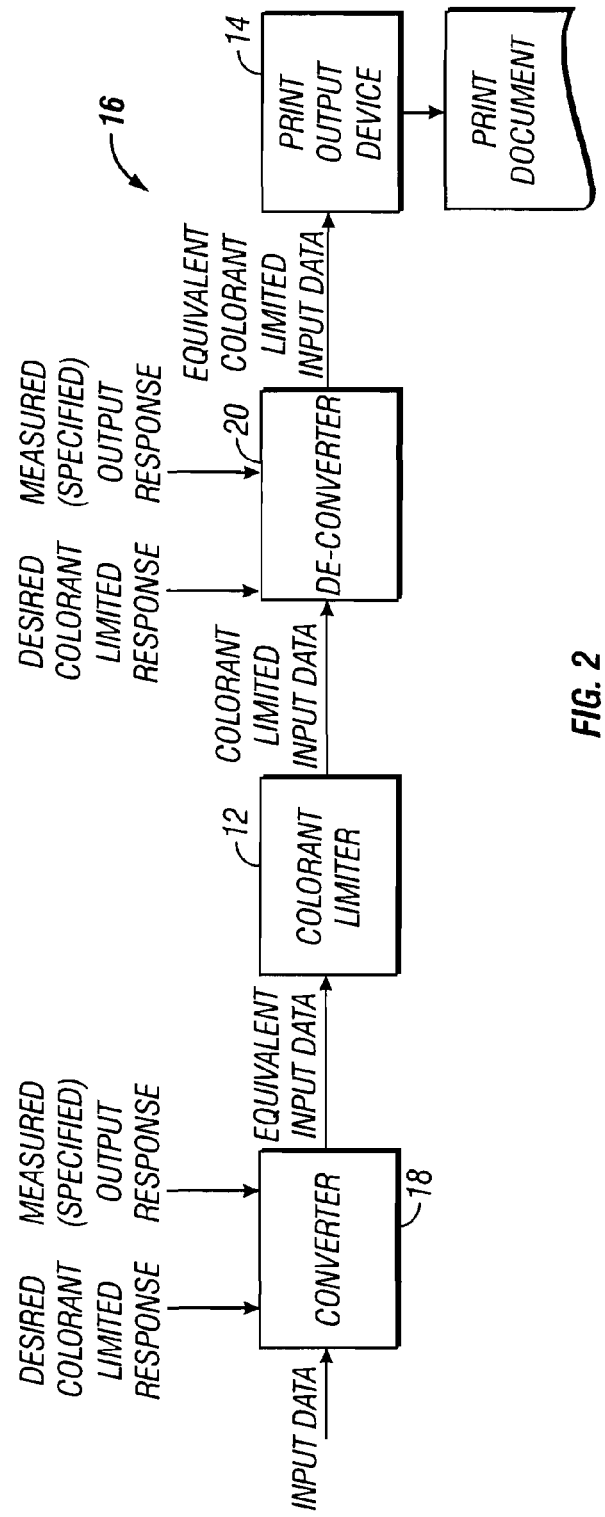
FIG. 2 is a block diagram of an exemplary embodiment of colorant limitation systems in accordance with this invention.

Referring now to FIG. 2, an exemplary colorant limitation system in accordance with this invention is described. Colorant limitation system 16 includes converter 18, which receives input data and provides "equivalent" input data to colorant limiter 12. Colorant limiter 12 provides colorant-limited input data to de-converter 20, which provides "equivalent" colorant limited input data for printing by printer 14. Input data may be, for example, CMYK input data provided by color processing software and/or hardware, computer memory, or any source of color data. Input data alternatively may include colorants other than C, M, Y and K, or may include fewer than or more than four colorants. As described in more detail below, converter 18 also receives desired and measured (or specified) output response data characterizing the response of printer 14. Colorant limiter 12 may be any software and/or hardware that implements a conventional colorant limitation algorithm, such as a density-based, area-based, or similar colorant limitation algorithm. De-converter 20 may provide equivalent colorant-limited input data directly to printer 14, or may provide the data to other hardware and/or software for additional processing prior to printing by printer 14.

The output of a color printer may be characterized as a function of input data values for each colorant. This characterization may be performed by measuring the output response of the printer, or may be specified as a target output response for the printer. For example, the output response of a printer may be measured by printing known values of single-channel colorants, and then measuring the printed sample using a measuring device such as a densitometer, spectrometer, colorimeter, spectro-photometer, or other device that provides an output that is a function of the spectrum of the printed sample. This process typically is repeated for a range of input data values for each color channel.

Figure 3:
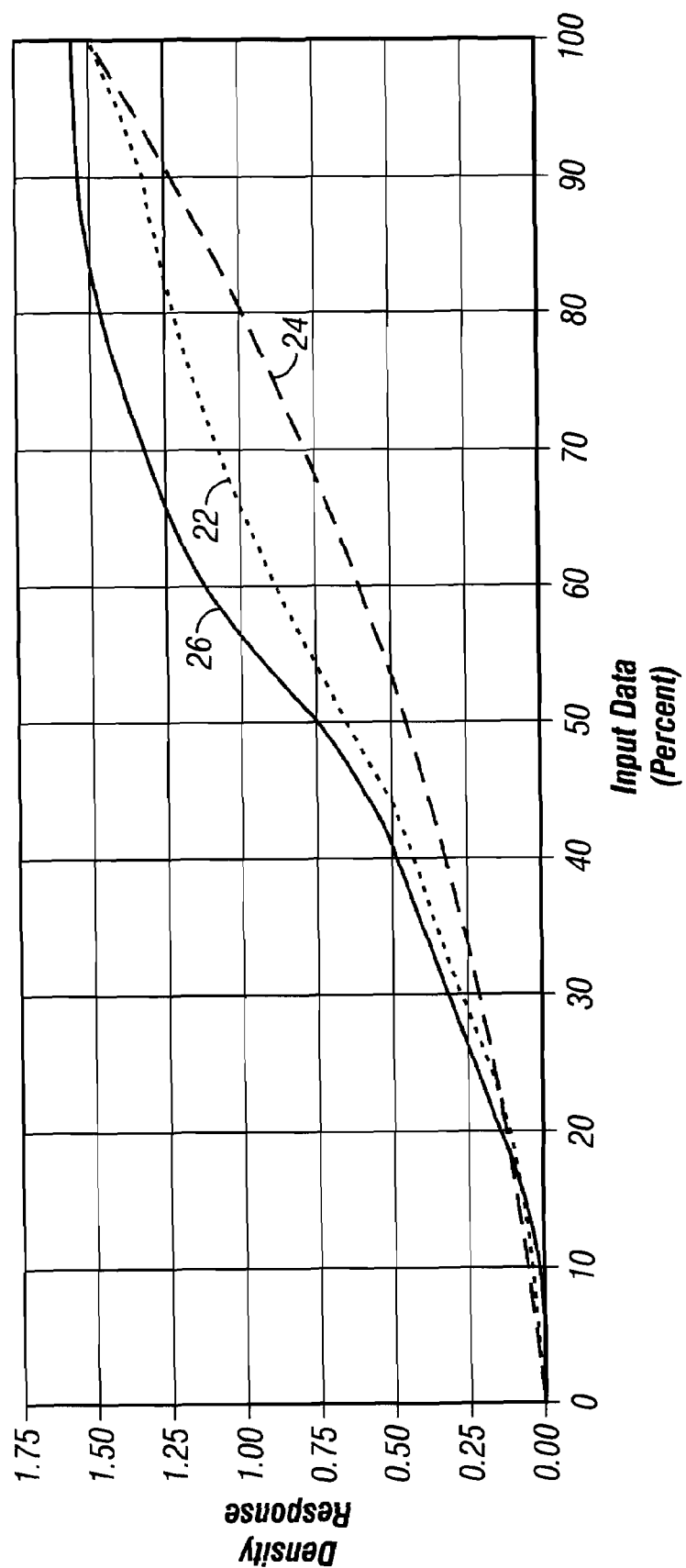
FIG. 3 is graph showing exemplary desired, measured and specified output density responses versus input data value in percent.

Referring now to FIG. 3, curve 22 represents an exemplary measured output density response of a single channel as a function of input data values in percent. Persons of ordinary skill in the art will understand that printer output characterization alternatively may be described in terms of other output response values (e.g., XYZ values, CIELAB values, spectral amplitude values, ink volumes, colorant weights, or other similar values), and that input data values alternatively may be described in terms of other values (e.g., numeric color counts, colorant duty ratio, or other similar values).

The measured output response of a printer typically varies from printer to printer, even for the same model printer. To compensate for this variation, many color processing systems include color calibration to match a printer's output response to a specified target output response. For example, referring again to FIG. 3, curve 24 represents an exemplary specified output density response of a single channel as a function of input data values in percent. To achieve the specified output density response, previously known color processing systems include software and/or hardware that maps "calibrated" input values having a specified output response to equivalent "uncalibrated" input values whose measured output response substantially equals the specified output response.

In addition to the measured and specified output responses, a "desired" output response may be obtained which represents the output response of a printer at a colorant limit at which no negative image artifacts result. The desired output response may be specified by the printer manufacturer. Alternatively, the desired output response may be obtained by empirical measurements, or may be obtained using any suitable technique for obtaining a desired output response. For example, a particular printer may be selected as a "golden master" printer whose performance will be used as a benchmark for specifying a desired output density response for that model of printer. By operating the golden master printer under a wide range of input data values on all colorant channels, a colorant limit may be determined at which no negative image artifacts result. Once the colorant limit is determined, the output density response of each colorant channel may be measured as a function of input data values, and these measured values may be set as the desired output response for that printer model. Referring again to FIG. 3, curve 26 represents an exemplary desired output density response of a single channel as a function of input data values in percent.

Figure 4:
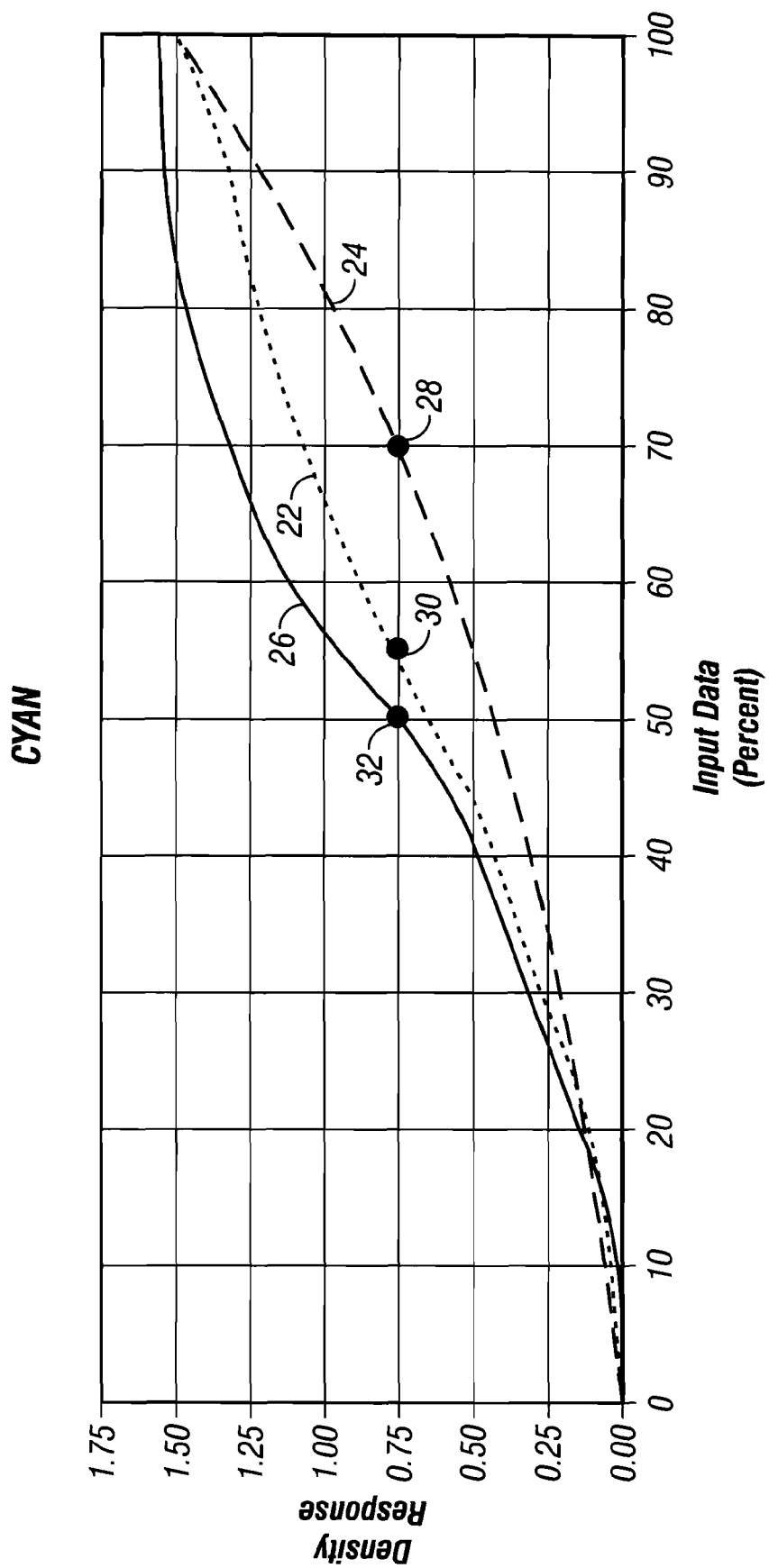
FIG. 4 is another graph showing exemplary desired, measured and specified output density responses versus input data value in percent.

Referring now to FIG. 4, distinctions between a printer's desired, measured and specified output response characteristics are described. Curve 26 represents an exemplary desired output density response for a printer for a single channel (e.g., CYAN) at a specific colorant limit (e.g., 200%). Curve 22 represents an exemplary measured output density response of the printer, and curve 24 represents an exemplary specified output density response for the same printer. Because of component variations and imperfections, the measured output density response of a printer typically will not identically match the printer's desired output density response or the specified output density response. Further, the measured output density response of a printer typically changes over time, and the differences between the measured output response and the desired and specified output responses may continue to increase as the printer ages.

In addition, desired output density response 26 may differ from measured output density response 22 and specified output density response 24 for most input data values. That is, a single input data value may correspond to three different output density values. Likewise, a single output density response may correspond to three unique input data values. For example, an output density response of approximately 0.76 corresponds to a calibrated input data value of 70% (illustrated by reference point 28), an uncalibrated input value of 55.2% (illustrated by reference point 30) and a desired input value of 50.4% (illustrated by reference point 32).

Although the output responses represented by curve 22, 24 and 26 differ, the data on each curve may be mapped to equivalent data points on the other two curves. Thus, in example described above, a calibrated input of 70% maps to an equivalent uncalibrated input of 55.2%, and also maps to an equivalent desired input of 50.4%. Colorant limitation methods and apparatus in accordance with this invention may be used with calibrated and uncalibrated input data values. In the former case, a calibration step follows colorant limitation to map calibrated input values to uncalibrated input values. In the latter case, a calibration step precedes colorant limitation to map calibrated input values to uncalibrated input values. For simplicity, the remainder of this description will refer primarily to colorant limitation methods and apparatus that use uncalibrated input data values. However, the principles of this invention are also applicable to colorant limitation methods and apparatus that use calibrated input data values.

Conventional colorant limitation algorithms typically operate without regard to the difference between the measured output density response and the desired output density response. In this regard, conventional colorant limitation algorithms operate as though the measured output density response of a printer matches the desired output density response. As a result, if a conventional colorant limitation algorithm were used with a printer having a single-channel output density response as shown by curve 22, the colorant limitation algorithm may substantially over-limit the colorant used to create an image.

To overcome this deficiency, methods and apparatus in accordance with this invention incorporate measured print output device performance into the colorant limitation process. Referring again to FIG. 2, converter 18 receives uncalibrated input data and desired and measured output response data characterizing the output response of printer 14, and provides colorant limiter 12 with equivalent uncalibrated input data that accounts for differences between the desired and measured output response of the printer. (For systems that use calibrated input data values, converter 18 receives calibrated input data and desired and specified output response data characterizing the output response of printer 14, and provides colorant limiter 12 with equivalent calibrated input data). Colorant limiter 12 may implement any conventional colorant limitation algorithm, which performs colorant limitation and then provides colorant-limited input data to de-converter 20. In this regard, colorant limitation system 16 includes measured (or specified) characteristics of printer 14 in the colorant limitation process.

As described above, the desired output response data may be obtained from the printer manufacturer, may be determined empirically, or may be obtained using any other equivalent technique for describing the desired output response of a printer. For a printer that includes multiple colorants, the desired output response of each colorant may be described as a function of input data values for that colorant. For example, in a CMYK printer, the desired output response of the C-channel may be described as a function of input data values on the C-channel, the desired output response of the M-channel may be described as a function of input data values on the M-channel, the desired output response of the Y-channel may be described as a function of input data values on the Y-channel, and the desired output response of the K-channel may be described as a function of input data values on the K-channel.

As also described above, a printer's output response may be characterized as density values, XYZ values, CIELAB values, spectral amplitude values, ink volumes, colorant weights, or other suitable values, and input data values may be specified in terms of percent (e.g., 50% C), numeric color counts (e.g., C=128), colorant duty ratio (e.g., 0.5 C), or other suitable values. Persons of ordinary skill in the art will understand that all such techniques for characterizing the output of a printer are within the scope of this invention. The printer output response may be provided by a densitometer, spectrometer, spectrophotometer, calorimeter, or other suitable device. The device may be separate from the printer, or may be included as part of the printer device. For simplicity, the following discussion will describe the output response of a printer in terms of output density as a function of input data values in percent.

Figure 5A:
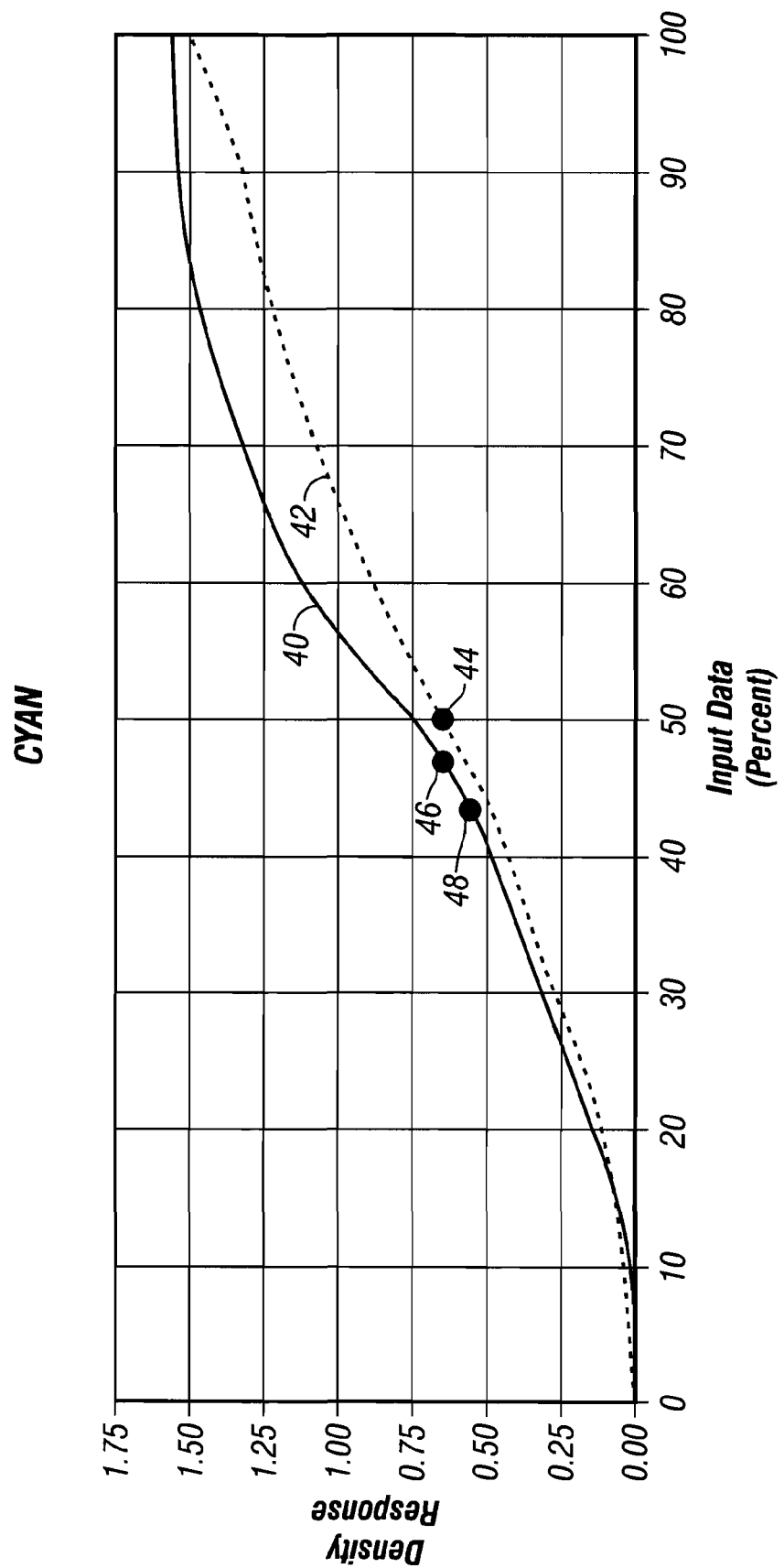
FIG. 5A is a graph illustrating an exemplary method of performing colorant limitation on a Cyan channel in accordance with this invention.
Figure 5B:
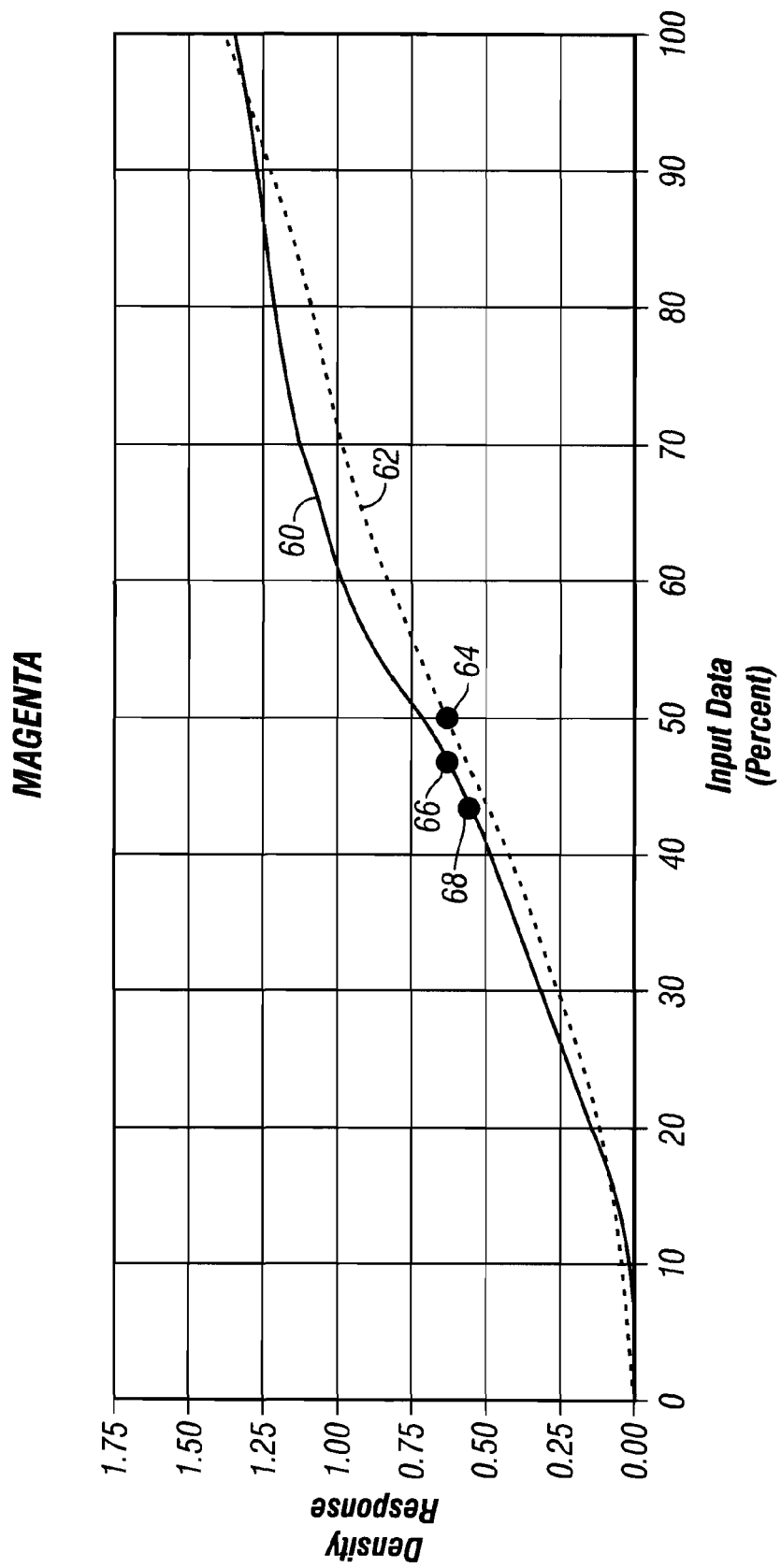
FIG. 5B is a graph illustrating an exemplary method of performing colorant limitation on a Magenta channel in accordance with this invention.
Figure 5C:
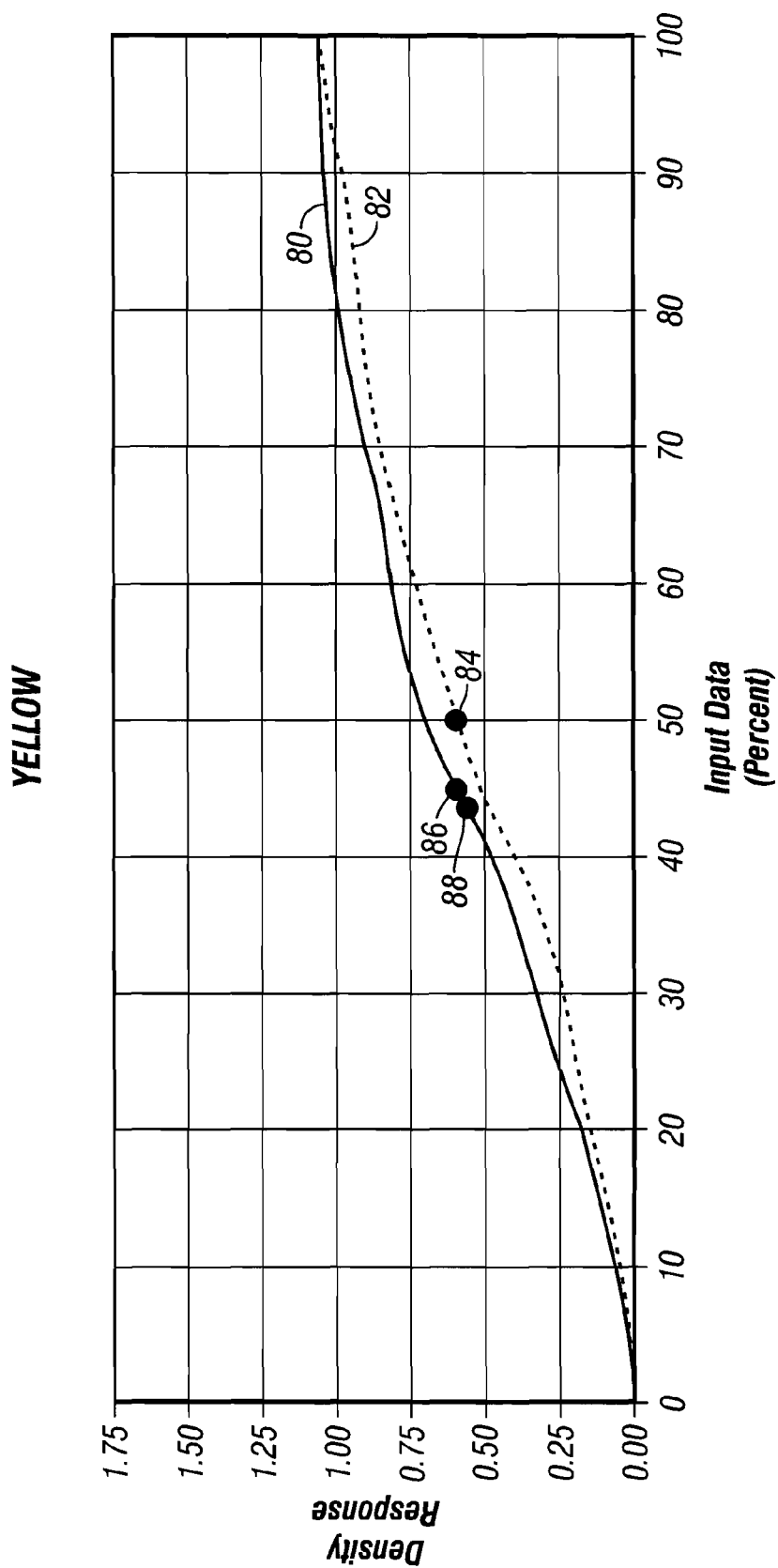
FIG. 5C is a graph illustrating an exemplary method of performing colorant limitation on a Yellow channel in accordance with this invention.
Figure 5D:
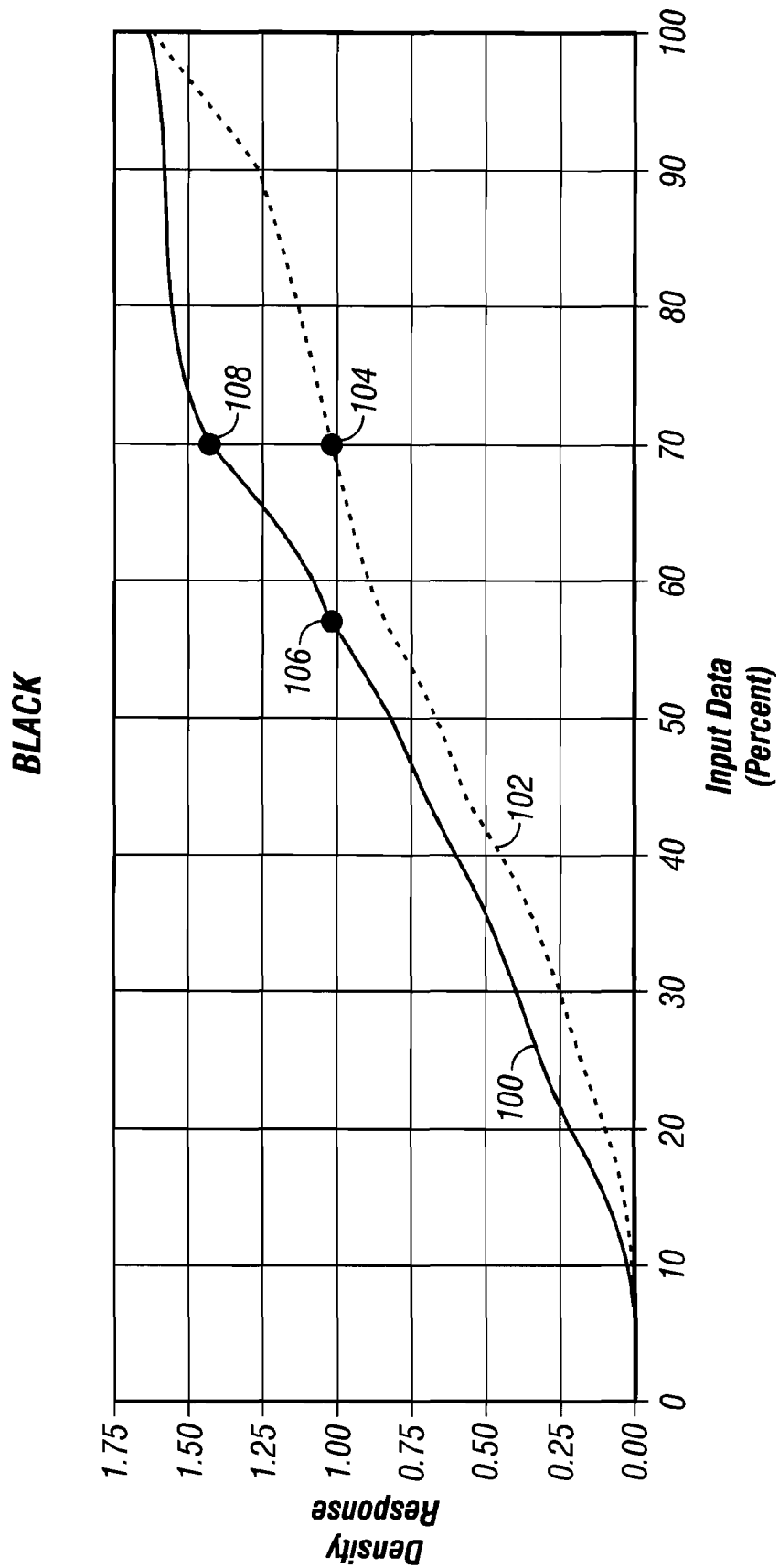
FIG. 5D is a graph illustrating an exemplary method of performing colorant limitation on a Black channel in accordance with this invention.

The desired output density response may be specified for multiple input data values from 0% to 100% for each colorant. The output density values may then be interpolated to estimate the desired output density response over the entire range of input data values for each colorant. FIGS. 5A-5D illustrate exemplary desired output density response values for each colorant channel of printer 14. In particular, FIG. 5A illustrates desired output density response values 40 for the C-channel of the printer, FIG. 5B illustrates desired output density response values 60 for the M-channel of the printer, FIG. 5C illustrates desired output density response values 80 for the Y-channel of the printer, and FIG. 5D illustrates desired output density response values 100 for the K-channel of the printer.

Next, the measured output response of print output device 14 is determined. For example, in accordance with previously-known techniques, the output density response of each colorant channel may be measured for numerous input data values. To obtain the measured output density response for each colorant, the output density response may be measured for multiple input data values from 0% to 100% of that colorant. The output density values may then be interpolated to estimate the measured output response over the entire range of input data values. This process is repeated for each colorant.

FIGS. 5A-5D illustrate exemplary measured output density response values for each colorant channel of printer 14. In particular, FIG. 5A illustrates measured output density response values 42 for the C-channel, FIG. 5B illustrates measured output density response values 62 for the M-channel, FIG. 5C illustrates measured output density response values 82 for the Y-channel, and FIG. 5D illustrates exemplary measured output density response values 102 for the K-channel. As shown in each of FIGS. 5A-5D, the desired output density response values of each color channel may differ from the measured output density response values for most input data values. Persons of ordinary skill in the art will understand that the order for obtaining desired and measured output density response values may be interchanged.

In accordance with known techniques, the desired and measured output density response values may be used directly, or may be converted from one measurement system to another measurement system. For example, a printer manufacturer may specify the desired output density response according to American National Standards Unit ("ANSI") STATUS A, STATUS T, Deutsches Institut für Normung e.V. ("DIN") 16536, or DIN 16536 NB density standards, but a user may obtain measured output density response values from a densitometer that provides output according to some other standard. Thus, the measured output density response measurements may be converted to the same standard used to characterize the desired density response. Further, the desired and measured output density response values may be stored in a convenient form such that they may easily be retrieved. For example, output density response values may be stored in a lookup table, or curve-fitting techniques may be used to determine mathematical equations that describe the desired and measured output density responses of print output device 14.

Figures 6, 7:
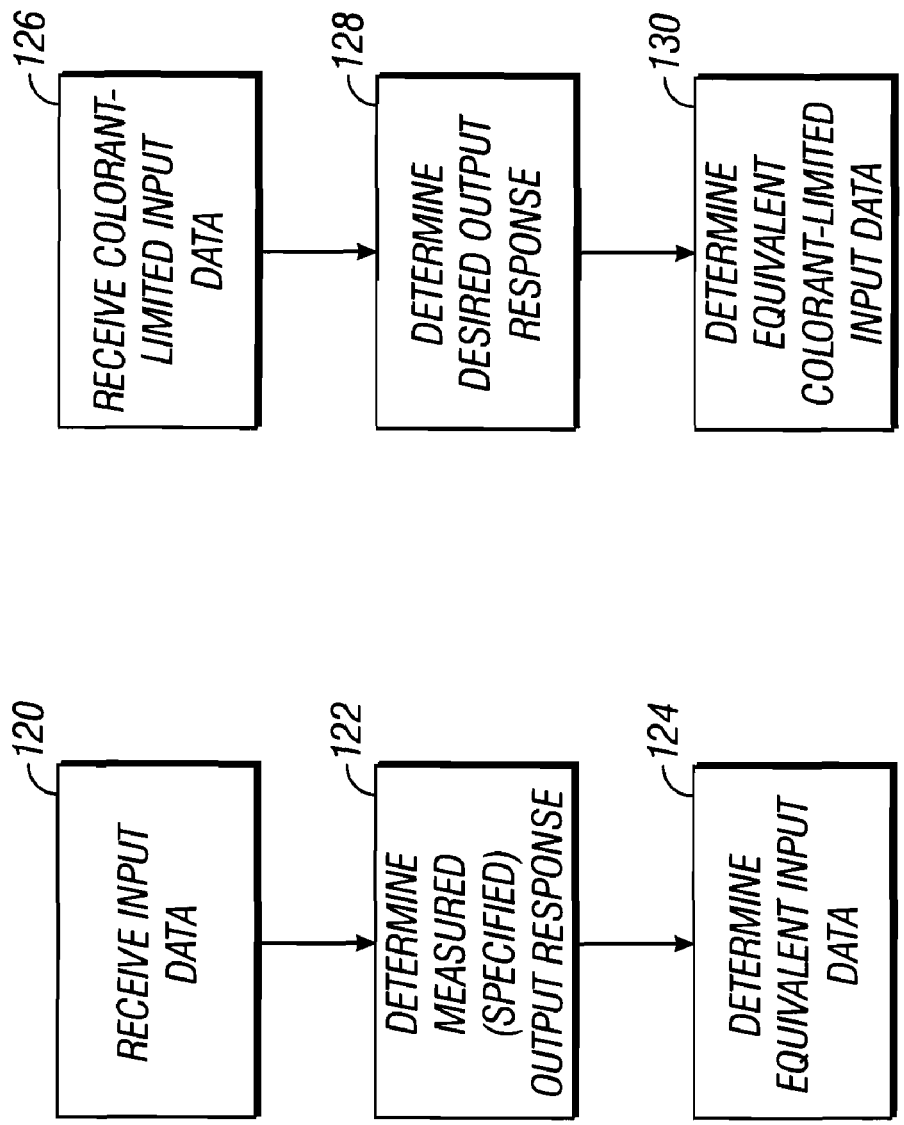
FIG. 6 is a block diagram illustrating an exemplary method for converting input data in accordance with this invention.
FIG. 7 is a block diagram illustrating an exemplary method for de-converting colorant-limited input data in accordance with this invention.

Referring now to FIGS. 2 and 6, the operation of converter 18 is described using exemplary uncalibrated input data. In particular, FIG. 6 illustrates the operation of converter 18 for a single color channel of input data. At step 120, input data are received. Next, at step 122, the measured output response corresponding to the input data value is determined. As mentioned above, measured output response data may be stored in a lookup table indexed by input data values. Thus, step 122 may be performed by retrieving from the lookup table the measured output density response data corresponding to the input data value. As part of this process, interpolation techniques may be used to determine the measured output density response for the exact input data value. At step 124, an equivalent input value is determined whose desired output response substantially equals the measured output response determined in step 122. Thus, if desired output response data also are stored in a lookup table indexed by input data values, a "reverse lookup" may be performed to determine the equivalent input value whose desired output response substantially equals the measured output response. The equivalent input data are then provided to colorant limitation algorithm 12. This process is repeated for each color channel, and for each input data value.

The process of FIG. 6 is illustrated in FIGS. 5A-5D, using exemplary input data values: 50% C, 50% Y, 50% M and 70% K. First, for each color channel, the measured output density response values corresponding to the input data values are determined. As shown in FIGS. 5A-5D, the input data values have measured output density response values of 0.65 for the C-channel (illustrated by reference point 44), 0.61 for the M-channel (illustrated by reference point 64), 0.59 for the Y-channel (illustrated by reference point 84), and 1.02 for the K-channel (illustrated by reference point 104).

Next, for each colorant channel, equivalent input data are determined whose desired output density response substantially equals the measured output response determined in the previous step. As shown in FIGS. 5A-5D, reference points 46, 66, 86 and 106 illustrate desired output response values that substantially equal the measured output response values for the C, M, Y and K channels, respectively. These reference points correspond to equivalent input data values of 46.8% C, 46.6% M, 44.8% Y, and 57.6% K, respectively. Persons of ordinary skill in the art will understand that a lookup table may be created for each colorant channel that provides equivalent input data values addressed by input data values.

Referring again to FIG. 2, equivalent input data are provided to colorant limiter 12, which may implement any conventional density-based, area-based, or similar colorant limitation algorithm. For example, the colorant limitation may be performed using any conventional Murray-Davies, Yule-Nielsen, density or area-based approach. The choice of algorithm is not critical to this invention. The important factor is that the measured printer state has already been taken into account when computing the colorant limitation.

To illustrate, colorant limiter 12 may implement the following density-based colorant limitation rule:

| | |
|---|---|
| Colorant Limit: | 200. |
| K: | no change. |
| C, M, Y: | scale proportionally to meet Colorant Limit. |

Thus, in the example described above, under a conventional colorant limitation method, nominal input data values 50% C, 50% M, 50% Y and 70% K (total colorant=220%) would be converted by the above algorithm to the following colorant-limited input data values: 43.3% C (illustrated by reference point 48), 43.3% M (illustrated by reference point 68), 43.3% Y (illustrated by reference point 88) and 70% K (illustrated by reference point 108). In contrast, in accordance with this invention, the equivalent input data values of 46.8% C, 46.6% M, 44.8% Y, and 57.6% K (total colorant=195.77) require no colorant limitation. As a result, the colorant-limited input data values would be: 46.8% C (illustrated by reference point 46), 46.6% M (illustrated by reference point 66), 44.8% Y (illustrated by reference point 86), and 57.6% K (illustrated by reference point 108).

As shown in FIG. 2, colorant limiter 12 provides colorant-limited input data to de-converter 20. FIG. 7 illustrates the operation of de-converter 20 for a single color channel of input data. At step 126, colorant-limited input data are received. Next, at step 128, the desired output response corresponding to the input data value is determined. As mentioned above, desired output response data may be stored in a lookup table indexed by input data values. Thus, step 128 may be performed by retrieving from the lookup table the desired output density response data corresponding to the colorant-limited input data value. As part of this process, interpolation techniques may be used to determine the desired output density response for the exact input data value. At step 130, an equivalent input value is determined whose measured output response substantially equals the desired output response determined in step 128. Thus, if measured output response data also are stored in a lookup table indexed by input data values, a "reverse lookup" may be performed to determine the equivalent colorant-limited input value whose measured output response substantially equals the desired output response. The equivalent colorant-limited input data may then be provided to printer 14 for printing, or may be provided to other color processing stages prior to printing by printer 14. This process is repeated for each color channel, and for each colorant-limited input data value.

Continuing with the above example, the operation of de-converter 20 is illustrated in FIGS. 7 and 5A-5D. First, for each color channel, the desired output density response values corresponding to the colorant-limited input data values are determined. As shown in FIGS. 5A-5D, the colorant-limited input data values have desired output density response values of 0.65 for the C-channel (illustrated by reference point 46), 0.61 for the M-channel (illustrated by reference point 66), 0.59 for the Y-channel (illustrated by reference point 86), and 1.02 for the K-channel (illustrated by reference point 106).

Next, for each colorant channel, equivalent colorant-limited input data are determined whose measured output density response substantially equals the desired output response determined in the previous step. As shown in FIGS. 5A-5D, reference points 44, 64, 84 and 104 illustrate measured output response values that substantially equal the desired output response values for the C, M, Y and K channels, respectively. These reference points correspond to colorant-limited equivalent input data values of 50% C, 50% M, 50% Y, and 70% K. Persons of ordinary skill in the art will understand that a lookup table may be created for each colorant channel that provides equivalent colorant-limited input data values addressed by colorant-limited input data values.

Figure 8A:
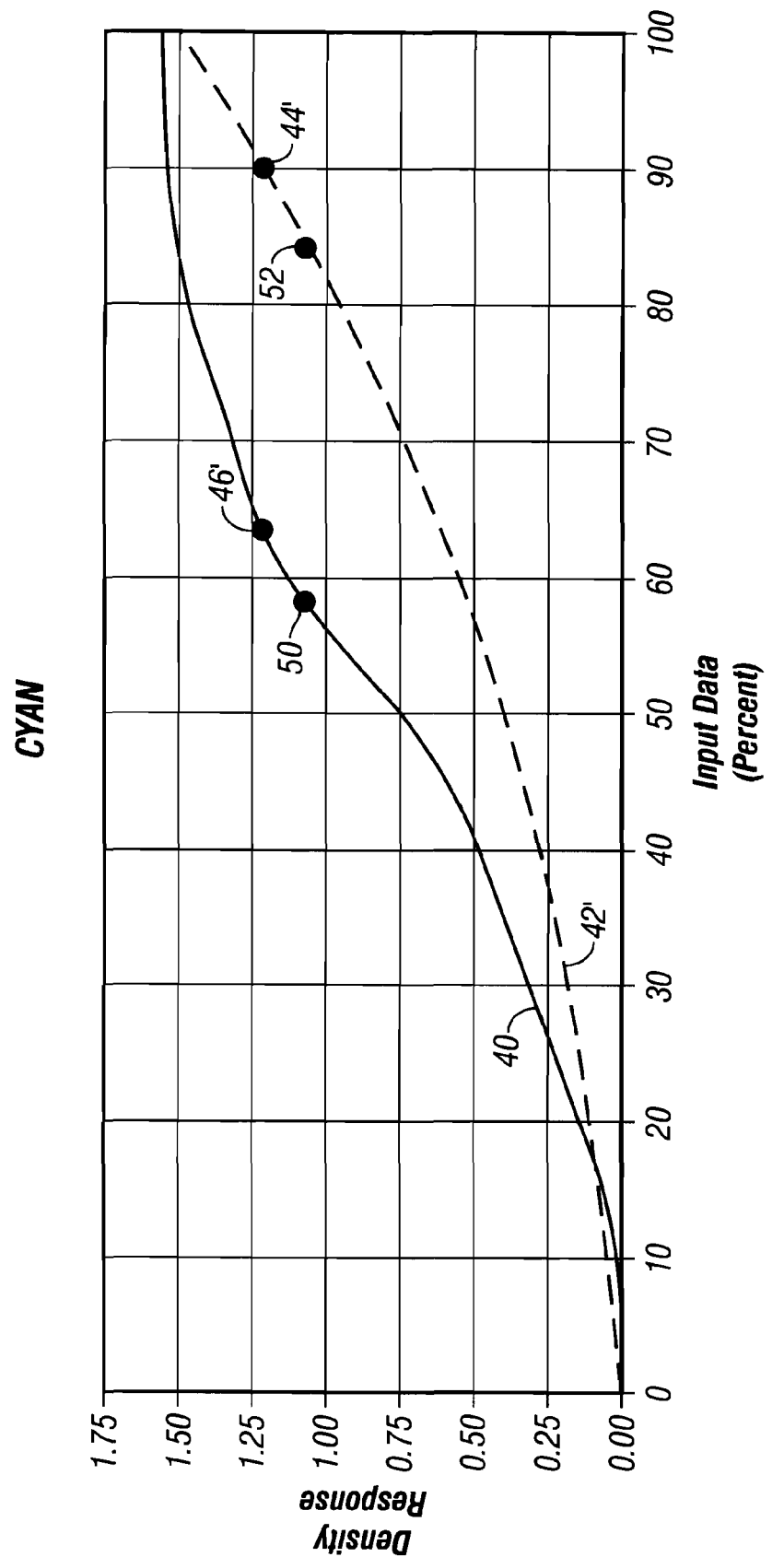
FIG. 8A is a graph illustrating another exemplary method of performing colorant limitation on a Cyan channel in accordance with this invention.
Figure 8B:
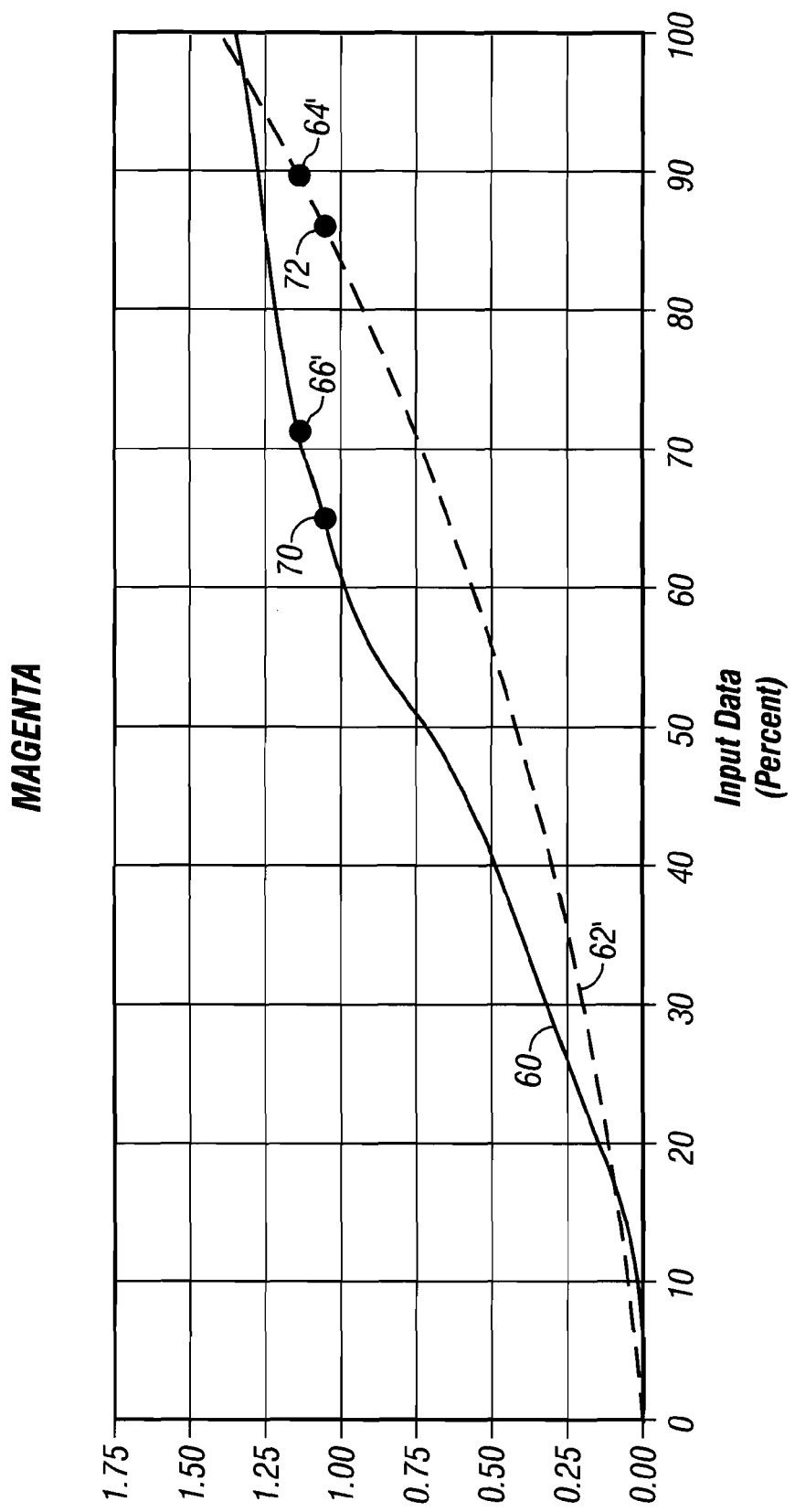
FIG. 8B is a graph illustrating another exemplary method of performing colorant limitation on a Magenta channel in accordance with this invention.
Figure 8C:
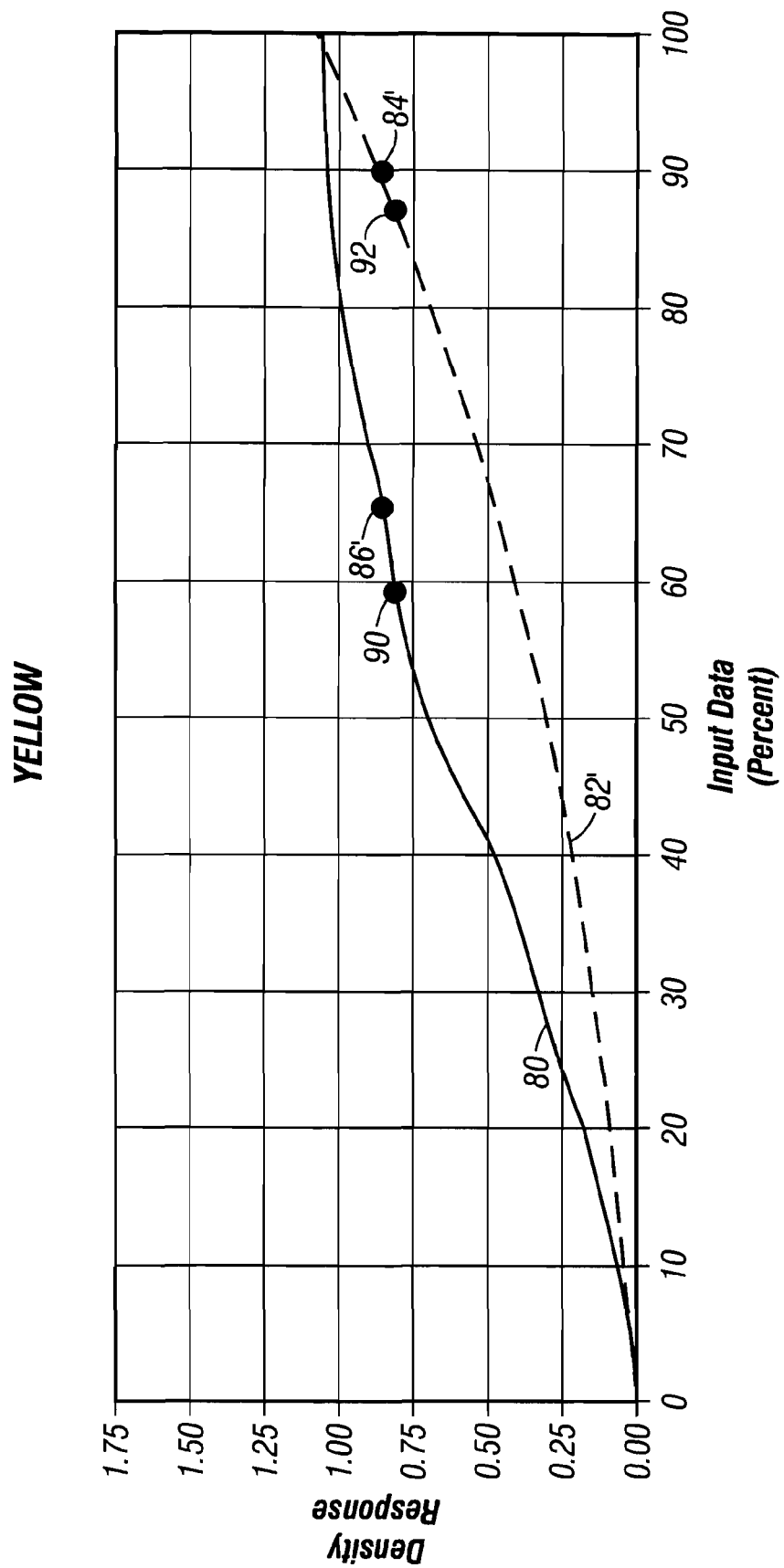
FIG. 8C is a graph illustrating another exemplary method of performing colorant limitation on a Yellow channel in accordance with this invention.
Figure 8D:
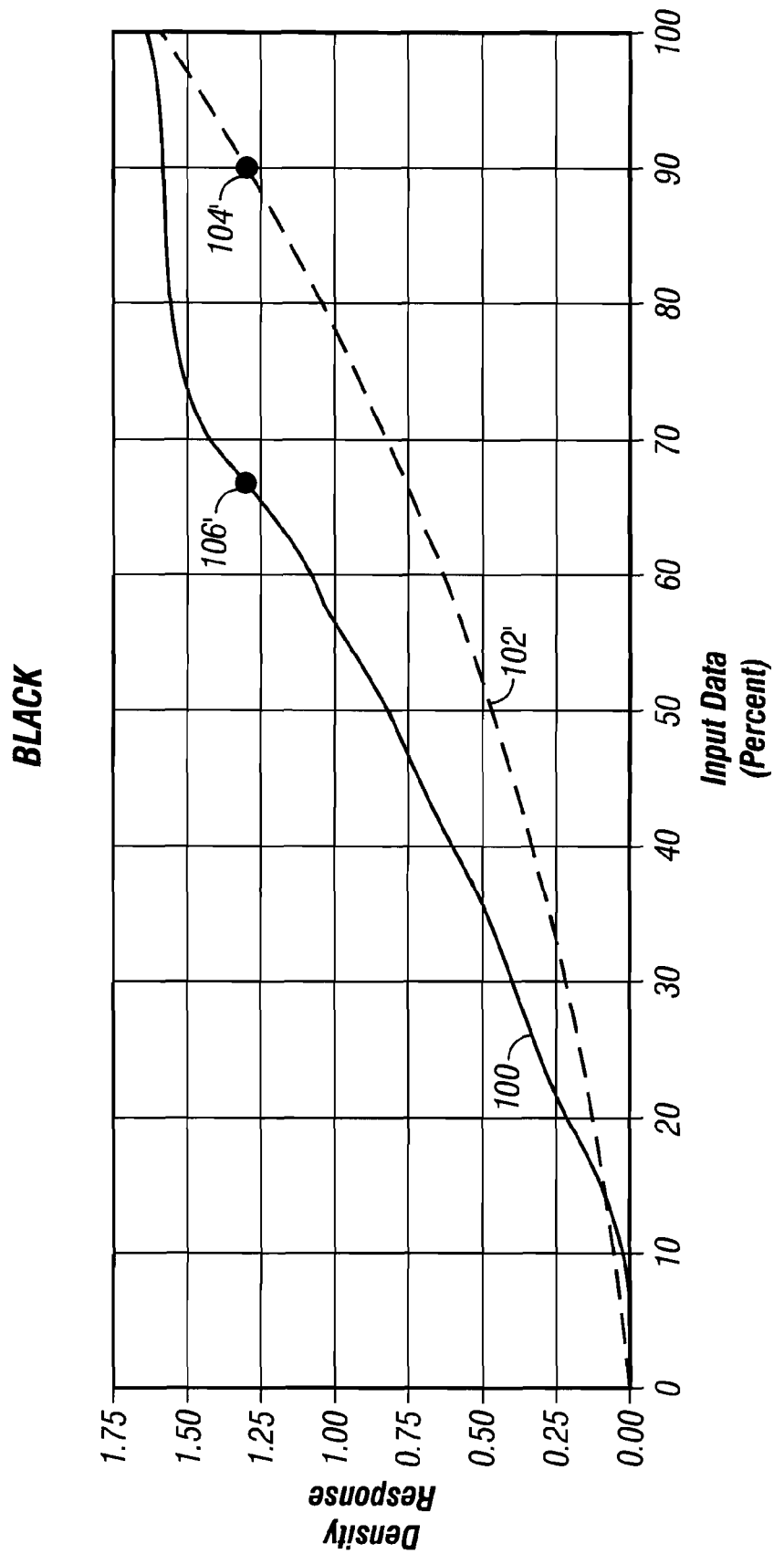
FIG. 8D is a graph illustrating another exemplary method of performing colorant limitation on a Black channel in accordance with this invention.

Referring now to FIGS. 2 and 8A-8D, the operation of converter 18 is described using exemplary calibrated input data. FIGS. 8A-8D illustrate exemplary desired and specified output density response values for each colorant channel of print output device 14. In particular, FIG. 8A-8D illustrate desired output density response values 40, 60, 80 and 100 for the C-channel, M-channel, Y-channel and K-channel, respectively. In addition, FIG. 8A illustrates specified output density response values 42', 62', 82' and 102' for the C-channel, M-channel, Y-channel and K-channel, respectively. As shown in each of FIGS. 5A-5D, the desired output density response values of each color channel may differ from the specified output density response values for most input data values.

The process of FIG. 6 is illustrated in FIGS. 8A-8D, using exemplary input data values: 90% C, 90% Y, 90% M and 90% K (total colorant=360%). First, for each color channel, the specified output density response values corresponding to the input data values are determined. As shown in FIGS. 8A-8D, the input data values have specified output density response values of 1.22 for the C-channel (illustrated by reference point 44'), 1.14 for the M-channel (illustrated by reference point 64'), 0.85 for the Y-channel (illustrated by reference point 84'), and 1.30 for the K-channel (illustrated by reference point 104').

Next, for each colorant channel, equivalent input data are determined whose desired output density response substantially equals the specified output response determined in the previous step. As shown in FIGS. 8A-8D, reference points 46', 66', 86' and 106' illustrate desired output response values that substantially equal the specified output response values for the C, M, Y and K channels, respectively. These reference points correspond to equivalent input data values of 64.3% C, 71.8% M, 65.7% Y, and 67.0% K, respectively. As described above, a lookup table may be created for each colorant channel that provides equivalent input data values addressed by input data values.

Referring again to FIG. 2, the equivalent input data values are provided to colorant limiter 12. In this example, colorant limiter 12 may implement the following colorant limitation rule:

| Colorant Limit: | 250. |
|---|---|
| K: | no change. |
| C, M, Y: | scale proportionally to meet Colorant Limit. |

Thus, in the example described above, under a conventional colorant limitation method, input data values 90% C, 90% M, 90% Y and 90% K (total colorant=360%) would be colorant-limited by the above algorithm to 53.3% C, 53.3% M, 53.3% Y and 90% K (total colorant=249.9%). In contrast, in accordance with this invention, the equivalent input data values of 64.3% C, 71.8% M, 65.7% Y, and 67.0% K (total colorant=268.8%) would be colorant-limited by the above algorithm to 58.31% C (illustrated by reference point 50), 65.11% M (illustrated by reference point 70), 59.58% Y (illustrated by reference point 90) and 67.0% K (illustrated by reference point 106') (total colorant=250%).

Referring again to FIG. 2, colorant limiter 12 provides colorant-limited input data to de-converter 20. The operation of de-converter 20 is illustrated in FIGS. 7 and 8A-8D. First, for each color channel, the desired output density response values corresponding to the colorant-limited input data values are determined. As shown in FIGS. 8A-8D, the colorant-limited input data values have desired output density response values of 1.06 for the C-channel (illustrated by reference point 50), 1.05 for the M-channel (illustrated by reference point 70), 0.80 for the Y-channel (illustrated by reference point 90), and 1.30 for the K-channel (illustrated by reference point 106').

Next, for each colorant channel, equivalent colorant-limited input data are determined whose specified output density response substantially equals the desired output response determined in the previous step. As shown in FIGS. 8A-8D, reference points 52, 72, 92 and 104' illustrate specified output response values that substantially equal the desired output response values for the C, M, Y and K channels, respectively. These reference points correspond to colorant-limited equivalent input data values of 83.43% C, 86.08% M, 86.81% Y, and 90% K. Persons of ordinary skill in the art will understand that a lookup table may be created for each colorant channel that provides equivalent colorant-limited input data values addressed by colorant-limited input data values.

Persons of ordinary skill in the art also will understand that that methods and apparatus in accordance with this invention may be modified to accommodate changes in print output device performance. For example, the output performance of a print output device may degrade as the device ages, and the differences between the measured and desired device performance may increase with time. Alternatively, the output performance of one or more color channels may experience some sudden failure that changes the measured output response of the printer. Such changes may be accommodated by periodically measuring the output response of the printer, and updating the data provided to converter 18.

Persons of ordinary skill in the art further will understand that methods in accordance with this invention may be implemented in computer software and/or hardware. In particular, methods in accordance with this invention may be implemented using any program language that may be used to program a programmable printer. Persons of ordinary skill in the art also will recognize that methods and apparatus in accordance with this invention may be implemented using steps or devices other than those shown and discussed above. For example although the discussion above has described the invention for a CMYK print system, methods and apparatus in accordance with this invention are not limited to CMYK print systems. Thus, this invention is equally applicable to print systems that include any number of colorants, such as CMY printers, printers that include colors in addition to CMYK (such as light cyan, light magenta, or RGB) or printers that may use other colors altogether (such as spot colors).

The invention claimed is:

1. A method for use with a printer, the method comprising:
   receiving an input data value for the printer;
   receiving desired output response data and measured output response data for the printer as a function of input data values;
   determining a measured output response data value corresponding to the input data value;
   determining an equivalent input data value whose desired output response data value substantially equals the determined measured output response data value;
   colorant limiting the equivalent input data value to provide a colorant limited input data value;
   determining a desired output response data value corresponding to the colorant-limited input data value;
   determining a colorant-limited equivalent input data value whose measured output response data value substantially equals the determined desired output response data value; and
   providing the colorant-limited equivalent input data value to the printer.

2. The method of claim 1, wherein the input data comprises C, M, Y and K data.

3. The method of claim 1, wherein the measured output response comprises any of density values, XYZ values, CIELAB values, spectral amplitude values, ink volumes, and colorant weights.

4. The method of claim 1, wherein the desired output response comprises any of density values, XYZ values, CIELAB values, spectral amplitude values, ink volumes, and colorant weights.

5. The method of claim 1, wherein colorant limiting comprises density-based colorant limitation.

6. The method of claim 1, wherein colorant limiting comprises area-based colorant limitation.

7. Apparatus for use with a printer comprising a desired output response and a measured output response as a function of input data values, the apparatus comprising:
   a first apparatus adapted to: (a) receive an input data value for the printer, (b) determine a measured output response data value corresponding to the input data value, and (c) determine an equivalent input data value whose desired output response data value substantially equals the determined measured output response data value;
   a colorant limiter adapted to receive the equivalent input data value and to provide a colorant limited input data value;
   a second apparatus adapted to: (a) determine a desired output response data value corresponding to the colorant-limited input data value, and (b) to determine a colorant-limited equivalent input data value whose measured output response data value substantially equals the determined desired output response data value.

8. The apparatus of claim 7, wherein the input data comprises C, M, Y and K data.

9. The apparatus of claim 7, wherein the measured output response comprises any of density values, XYZ values, CIELAB values, spectral amplitude values, ink volumes, and colorant weights.

10. The apparatus of claim 7, wherein the desired output response comprises any of density values, XYZ values, CIELAB values, spectral amplitude values, ink volumes, and colorant weights.

11. The apparatus of claim 7, wherein colorant limiting comprises density-based colorant limitation.

12. The apparatus of claim 7, wherein colorant limiting comprises area-based colorant limitation.

* * * * *